US005671090A

United States Patent [19]

Pernick et al.

[11] Patent Number: 5,671,090

[45] Date of Patent: Sep. 23, 1997

[54] METHODS AND SYSTEMS FOR ANALYZING DATA

[75] Inventors: Benjamin J. Pernick, Forrest Hills; Nils J. Fonneland, Lake Grove, both of N.Y.

[73] Assignee: Northrop Grumman Corporation, Los Angeles, Calif.

[21] Appl. No.: 322,927

[22] Filed: Oct. 13, 1994

[51] Int. Cl.$^6$ .................... G02B 5/08

[52] U.S. Cl. .................... 359/561; 359/900; 382/129; 382/210; 365/125; 365/216

[58] Field of Search .................... 359/29, 561, 900; 382/129, 210; 365/49, 125, 216

[56] References Cited

U.S. PATENT DOCUMENTS

| | | | |
|---|---|---|---|
| H331 | 9/1987 | Gregory et al. | 382/31 |
| H780 | 5/1990 | Hartman | 356/71 |
| 3,064,519 | 11/1962 | Shelton, Jr. | 351/106 |
| 3,612,640 | 10/1971 | Kogelnik | 359/29 |
| 3,624,605 | 11/1971 | Aaagard | 359/561 |
| 3,773,401 | 11/1973 | Douklias et al. | 359/561 |
| 3,885,143 | 5/1975 | Ishii | 359/561 |
| 4,084,153 | 4/1978 | Otten | 359/29 |
| 4,735,486 | 4/1988 | Leib | 359/561 |
| 4,988,153 | 1/1991 | Paek | 359/15 |
| 5,148,316 | 9/1992 | Horner et al. | 359/561 |
| 5,220,622 | 6/1993 | Scarr | 359/561 |
| 5,239,548 | 8/1993 | Babbitt et al. | 359/561 |
| 5,262,979 | 11/1993 | Chao | 359/561 |
| 5,274,716 | 12/1993 | Mitsuoka et al. | 359/561 |
| 5,285,411 | 2/1994 | McCaulay | 365/49 |
| 5,339,305 | 8/1994 | Curtis et al. | 359/29 |

FOREIGN PATENT DOCUMENTS

| | | | |
|---|---|---|---|
| 0049230 | 3/1985 | Japan | 359/561 |

OTHER PUBLICATIONS

D. Psaltis, et al., "Optical Information Processing Based On An Associative-Memory Model Of Neural Nets With Thresholding And Feedback", *Optics Letters* vol. 10, No. 2, Feb. 1985, pp. 98–100.

Francis T.S., Yu, et al., "Application Of One-Step Holographic Associative Memories To Symbolic Substitution", *Optical Engineering,* vol.27, No. 5, May 1988, pp. 399–402.

J. Calatroni "Coding of Spatial and Chromatic Information By Means Of Fourier Holography In White Light", *Optics Comm.,* vol.19, No.1, Oct. 1976 pp. 49–53.

(List continued on next page.)

*Primary Examiner*—Paul M. Dzierzynski
*Assistant Examiner*—John Juba, Jr.
*Attorney, Agent, or Firm*—Terry J. Anderson; Karl J. Hoch, Jr.

[57] ABSTRACT

A method and system for searching for a given sequence in a data base having a multitude of reference sequences stored or identified therein. In accordance with this method, a light beam is modulated with patterns representing the reference sequences, and with a pattern representing the given sequence, and a correlation signal is generated representing the correlation of the reference and given sequences.

Optical diffraction patterns may be used to represent the given and reference sequences. In one embodiment, a multitude of first diffraction patterns, each one representing the given sequence, are formed in an optical medium, and a light beam is modulated with each of those multitude of diffraction patterns to form a multi-channel signal beam. Each channel of that beam is then modulated with a respective one second diffraction pattern representing one of the reference sequences to form a multi-channel correlation beam. The intensity of each channel of the correlation beam is then measured to determine whether the given sequence correlates with any of the reference sequences.

30 Claims, 4 Drawing Sheets

OTHER PUBLICATIONS

T. Holladay, et al., "Phase Control By Polarization In Coherent Spatial Filtering", JOSA vol. 56, No. 7, pp. 869–872, Jul. 1966.

C.M Verber, et al., "An Integrated Optical Spatial Filter" Optics Comm., vol. 34, No. 1, pp. 32–34, Jul. 1980.

N. Brousseau, R. Brousseau, J.W.A. Salt, L. Gutz and M.D.B. Tucker, "Analysis of DNA sequences by an optical time–integrating correlator," Applied Optics 31 (23) 4802–4815 (Aug. 10, 1992).

W. A. Christens–Barry, J.F. Hawk, and J.C. Martin, "Vander Lugt correlation of DNA sequence data", *Optical Information Processing Systems and Architectures II*, SPIE 1347, 221–230 (1990).

W.A. Christens–Barry, D.H. Terry, and B.G. Boone, "Detection of DNA sequence symmetries using parallel micro–optical devices", *Optical Information processing Systems and Architectures III*, SPIE 1564, 177–188 (1991).

METHODS AND SYSTEMS FOR ANALYZING DATA

BACKGROUND OF THE INVENTION

This invention generally relates to a method and system for analyzing data, and more particularly to a method and system for searching a data base for a given record. Even more specifically, a preferred embodiment of the present invention relates to a method and system for searching a data base of known DNA sequences for a sequence that matches or closely resembles a given DNA sequence.

The genetic instructions that determine an individual's biological characteristics and processes are encoded in the chromosomes of that individual's cells. These chromosomes contain long chains of the molecule deoxyribonucleic acid, referred to as DNA, and these chains are commonly represented in the form of a double helix. A gene is a portion of the DNA structure that is necessary for making a complete protein. The genes are composed of various arrangements or sequences of four nucleotide bases, called adenine, thymine, cytosine, and guanine, which are designated by the letters A, T, C, and G, respectively. The genes are always grouped in the base pairs A-T and G-C, and a DNA sequence refers to the ordering or pattern of the nucleotide bases in the gene. The length of a DNA sequence can be very large, and for instance, a DNA sequence may have between 2,000 and two million base pairs.

There are approximately three billion different DNA base pairs that may be found in humans, and the particular DNA sequences that each person has are located in 23 pairs of chromosomes that contain about 100,000 individual genes. It is of great significance that faulty genes can be linked to a large variety of human afflictions. An ability to relate an individual gene directly with a particular medical health problem can lead to predictive tests, treatments, and potential cures for a wide variety of medical problems and hereditary ailments.

Currently, about 2,000 human DNA sequences are known and identified, and these DNA sequences are stored in available data bases. The number of known and identified human DNA sequences is only a small fraction of the enormous total number of human DNA sequence combinations, and the number of such known and identified DNA sequences is growing rapidly. In addition, the number of DNA sequences of other organisms that have been identified and that are available in data bases is also large and likewise growing with time.

The DNA sequence information contained in these growing data bases will be a major instrument for basic medical and biological research activities for many years. This information will also be a basis for developing curative techniques for medical and hereditary afflictions. In order to use effectively the information in these enormous and growing data bases, it is necessary to provide an efficient means to access that information. In particular, it is necessary to provide an efficient and reliable means to compare a given DNA sequence to the library of known DNA sequences in the data bases. Such a comparison is useful to identify, analyze, and interpret that given DNA sequence.

Current procedures for making such comparisons are comparatively slow and impractical. As the amount of stored information increases, current search methods will become unable to function with practical, short processing times, and these methods will have very slow operating speeds. Thus, there is an important and immediate need for systems and procedures to perform DNA sequence matching with convenient data base access, high speed processing, accuracy, and cost efficiency.

It is not practical to use computers exclusively to store, manage, and search data in extremely large data bases, even though the data is stored electronically in those computers. In an article "Analysis of DNA Sequences by an Optical Time-Integrating Correlator," by N. Brousseau, R. Brousseau, J. W. A. Salt, L. Gutz, and M. D. B. Tucker, *Applied Optics,* 31 (23), pages 4802–4815, Aug. 10, 1992, (Brousseau et al.), it is estimated that a complete search of the currently identified DNA sequences, even assuming those sequences were only 300 bases long, would take on the order of several minutes on a high speed main frame computer, and over several hours on a personal computer. This technology is clearly not practical for searching large scale DNA data bases, which may have three billion or more base pair data items.

Brousseau et al. also describes an acousto-optic correlator system for analyzing DNA sequences. This system generically represents a time-integrating correlator configuration using coherent light. Other acousto-optic configurations, as well as other time integrating systems using electro-optic devices or liquid crystal light modulators, may also be used to analyze DNA sequences.

There are several disadvantages to this approach, however. For example, the correlation output signal of such systems inherently includes variable bias levels that are dependent upon the signal strength of the individual input and reference sequences to be processed. Extra processing steps must be performed to minimize the influence of these bias levels. In addition, the strength of the input signals to the acousto-optic devices must be kept low to avoid spurious contributions to the correlation output signal as a result of well-known non-linear operations of the acousto-optic devices.

Also, the time-bandwidth product—which is a measure of the length of time that one input signal can be processed at any one time—of acousto-optic devices is low, and this lowers the overall speed of operation of any system employing such devices. Thus, if a single DNA sequence is too long to be processed in one step, then repeated time-shift operations must be performed to process fully that DNA sequence. Still further, if an optical device is used that involves an interferometer configuration, such as illustrated in FIG. 1 of Brousseau et al., then it is important that the optical device be stringently aligned and mechanically stable.

A system that simulates optical correlation of DNA sequences using a traditional Vander Lugt architecture with coherent illumination is disclosed in "Vander Lugt Correlation of DNA Sequence Data," by W. A. Christens-Barry, J. F. Hawk, and J. C. Martin, *Optical Information Processing Systems, and Architectures II,* SPIE 1347, pages 221–230 (1990) (Christens-Barry et al. I). In this system, each of the base symbols, A, C, G, and T, and each combination thereof, such as A or C, C or G or T, is represented by a respective one four-by-four pixel array, which is composed of a binary encoding, (amplitude or phase), of the sixteen elements in the array. This simulation also employs a dc block in the matched optical filter of the test sequence and only uses the fundamental and harmonic components, described as $f_x$, $2f_x$, $f_y$, $2f_y$, of each base symbol in the correlation calculation.

There are disadvantages with this type of correlation processor. For example, the use of a square or any other two-dimensional array format to represent base symbols reduces the space-bandwidth product of the spatial modulator used in the processor to hold the optical images of the base pairs of those arrays, and this reduces the capacity of the correlator. Further, because a two-dimensional array format is used to represent the input or target sequence, there is a requirement to repeat several four-by-four pixel base symbols in order to prevent missing correlations due to the fact that the test sequences are presented in a severed, multiple line format. This requirement also reduces the space bandwidth product of the system disclosed in Christens-Barry et al. I. In addition, the use of only the fundamental and first harmonic spatial frequencies in the correlator calculation, rather than the spatial frequency content over a band beyond the dc component, increases the likelihood of false identifications.

A third prior art system is disclosed in the article "Detection of DNA Sequence Symmetrics Using Parallel Micro-Optical Devices," by W. A. Christens-Barry, D. H. Terry, and B. G. Boone, *Optical Information Processing Systems and Architectures III,* SPIE 1564, pages 177–188 (1991) (Christens-Barry et al. II). This systems simulates a multichannel optical correlator system that employs noncoherent light, and also uses a binary format. Each of the base symbols A, C, G, and T is represented as a four-by-one pixel array, and thus the sequence arrays are two-dimensional and rectangular in shape. This article discloses reference sequences that are six bases in length, and thus the sequence array is six-by-four pixels in size. The six-by-four sequence arrays are designed and arranged so that they usually have a certain symmetry. More specifically, the value of the pixel at row i, column j, represented by the symbol $a_{i,j}$, is the binary complement of the pixel at row 7-i, column j. Thus, $a_{i,j}$ equals $a'_{7-i,j}$, where a' is the binary complement of a. For instance, if the pixels are considered to be either black or white, then black is the binary complement of white. In the prior art system disclosed in Christens et al. II, this symmetry property is sought in the output of the ccd detector array.

In this prior art multichannel processor, a microlens array is used to project or replicate an image of an array of reference sequences onto a fixed mask that contains a multitude of spatially separated copies of an image of a base sequence to be identified. For example, a video monitor may be used to input encoded reference sequences into the disclosed optical system.

There are a number of problems with this type of optical processor. For instance, the microlens array introduces distortions into the image projected onto the fixed mask. More specifically, when the lens element of the microlens array is not precisely on the system axis, the image projected onto the fixed mask is not uniformly illuminated, and vignetting of that image occurs. Moreover, the system disclosed in Christens-Barry II suffers from a loss of spatial bandwidth product, as does the system disclosed in Christens-Barry I.

In addition, the use of fixed masks adversely affects the ability of the system to operate in real time. This reference also discloses the use of spatial light modulators in the System. A bundle of optical fibers is used to transfer the superposed reference sequence-unknown base sequence—that is, the image formed by the superposition of the images of the reference sequence on the images of the unknown base sequence—to an output CCD device. The fixed size of the optical fiber bundle prevents it from being expanded such that it could be used with reference sequence arrays having other sizes.

SUMMARY OF THE INVENTION

An object of this invention is to provide an effective, high speed system and method for searching a data base for a given data sequence.

Another object of the present invention is to provide a multi-channel optical processing system to search for a given DNA sequence in a data base of such sequences.

A further object of this invention is to use sine wave pulses to encode DNA sequences in an optical medium.

Another object of the present invention is to pre-select DNA sequences, for comparison to a given sequence, on the basis of the number of each type of base nucleotide in the DNA sequences.

These and other objectives are attained with a method and system for searching for a given sequence in a data base having a multitude of reference sequences stored or identified therein. In accordance with this method, a light beam is modulated with patterns representing the reference sequences, and with a pattern representing the given sequence, and a correlation signal is generated representing the correlation of the reference and given sequences.

Optical diffraction patterns may be used to represent the given and reference sequences. In one embodiment, a multitude of first diffraction patterns, each one representing the given sequence, are formed in an optical medium, and a light beam is modulated with each of those multitude of diffraction patterns to form a multi-channel signal beam. Each channel of that beam is then modulated with a respective one second diffraction pattern representing one of the reference sequences to form a multi-channel correlation beam. The intensity of each channel of the correlation beam is then measured to determine whether the given sequence correlates with any of the reference sequences.

In an alternate procedure, a single diffraction pattern representing the given sequence is formed in a first optical medium, and a multitude of diffraction patterns representing the reference sequences are formed in a second optical medium. A light beam is modulated with the diffraction pattern formed in the first optical medium, and then modulated with each of the diffraction patterns formed in the second optical medium, to produce a multi-channel correlation beam. The intensity of each channel of the correlation beam is then measured to determine whether the given sequence correlates with any of the reference sequences.

The reference sequences and the given sequence are preferably DNA sequences; and in this case, the reference sequences in the data base may be pre-sorted, prior to being correlated with the given sequence, on the basis of the numbers of each type of nucleotide base in the reference sequence. In particular, the reference sequences in the data base are identified that have the same numbers of each of the A, C, G, and T elements as the given sequence, and then those identified reference sequences are correlated with the given sequence.

Preferably a respective one type of sine wave modulated pulse is used to represent each type of nucleotide base. Each DNA sequence is encoded by forming a diffraction pattern of a sequence of sine wave modulated pulses representing the nucleotide bases in the DNA sequence.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
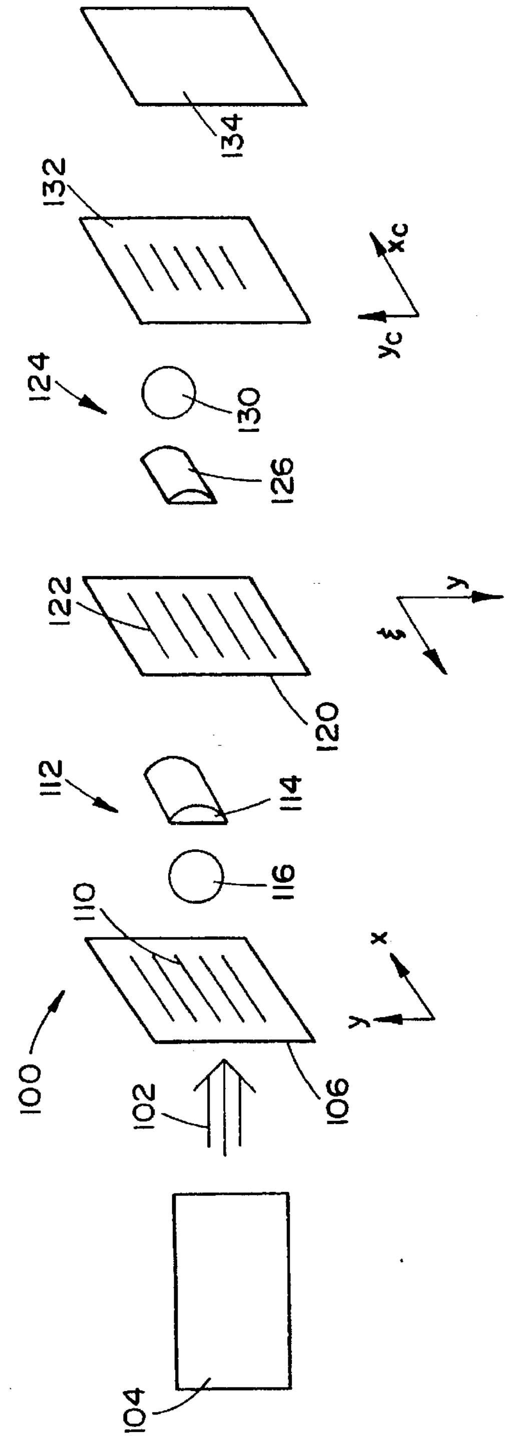
FIG. 1 is a schematic diagram of an optical correlator system embodying the present invention.

FIG. 1 illustrates an optical correlator system or configuration 100 that functions as a multichannel processor, seeking correlation between a given or unknown DNA sequence and a set of n-reference DNA sequences. System 100 is particularly well suited for processing short DNA sequences. The size of a short sequence is determined by the space bandwidth product of the optical recording components used in the system.

In a first mode of operation of system 100, a laser beam 102 from a suitable source 104 is transmitted through a recording medium 106 that has been encoded with the given DNA sequence—that is, an image 110, extending in the x-direction, representing the given DNA sequence has been formed or recorded in medium 106. Preferably, to correlate the given DNA sequence with a set of n-reference DNA sequences, that given DNA sequence is encoded n times in medium 106, with each encoding image 110 forming a respective one of the n-lines that are vertically spaced apart along the y-axis of medium 106. Any suitable recording medium 106 may be used in system 100, and for instance, that medium may be a spatial light modulator. Also, the DNA sequence may be represented or encoded in that medium 106 in any suitable manner, and several suitable encoding procedures are described below in detail.

Laser beam 102 is spatially modulated as it passes through medium 106, and the modulated beam then passes through lens system 112. As will be understood by those of ordinary skill in the art, it is not necessary to the practice of the present invention in its broadest sense that laser beam 102 be transmitted through medium 106 in order to spatially modulate the laser beam in the desired manner, and that beam may be modulated by reflecting the laser beam off a reflective input medium encoded with the given DNA sequence.

Lens system 112, which preferably comprises a cylinder 114 and a spherical lens 116 in any order, is used to form on plane 120 a separate, respective one diffraction spectrum 122 of each one of the n-input lines 110 in medium 106. Each of these diffraction spectra extends horizontally on plane 120, along the ξ direction of the plane, and these diffraction spectra are vertically spaced apart along the y-direction of plane 120.

The order in which these diffraction spectra or patterns are formed or arranged on plane 120 is inverted compared to the order in which the encoded images 110 are arranged in plane 106—that is, the diffraction pattern formed on the bottom line of plane 120 is formed from the top image in plane 106, and the diffraction pattern formed on the top line in plane 120 is formed from the bottom line of plane 106. Lens system 112 also forms a particular component of the diffraction pattern on plane 120 from each pattern or line in plane 106. This component pattern is referred to as the dc component of the image in plane 106 from which the component pattern is formed. The diffraction pattern that is formed from each line 110 in plane 106 are formed on the same line of plane 120, with the diffraction pattern that represents the dc component of that line 110 being generally centered along the line pattern formed on plane 120.

Plane 120 thus also contains diffraction patterns 122 representing each of n-reference DNA sequences. Preferably, these patterns extend along the horizontal or ξ direction of plane 120, and the patterns are spaced apart along the vertical or y-direction of the plane. Plane 120 may also be made of any suitable medium such as a spatial light modulator. The spacings of the n copies of the input diffraction pattern in plane 106 and of the n reference diffraction patterns formed in plane 120 are adjusted such that each one of the optically formed, multichannel spectrum of the n-replicated input DNA sequences is projected onto a respective one of the reference diffraction patterns. In this way, the input pattern spectrum and the reference spectrum are in a one-to-one correspondence.

Figure 2:
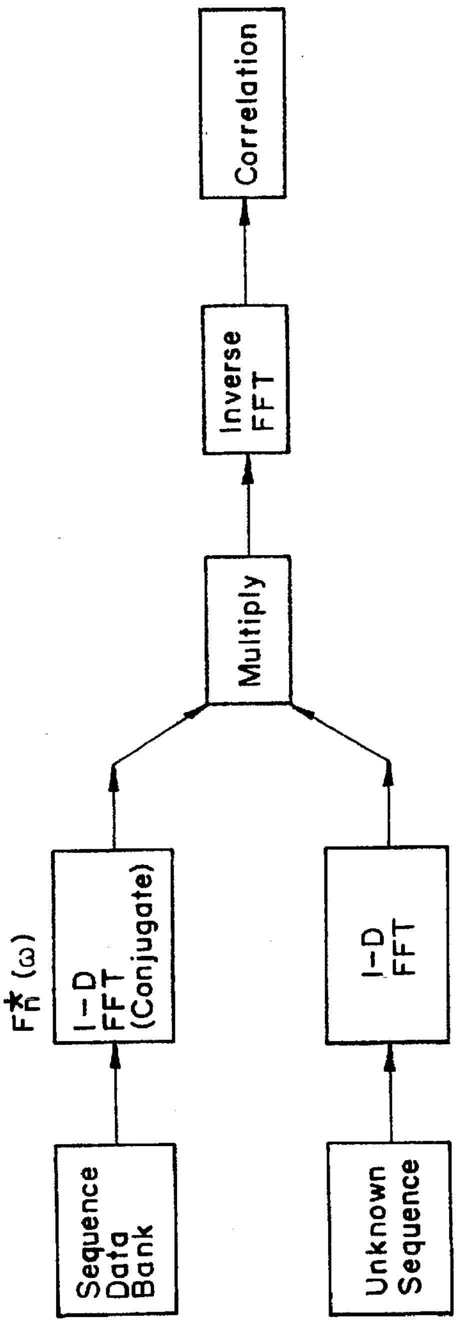
FIG. 2 is a block diagram illustrating the operation of the system of FIG. 1.

With reference to FIGS. 1 and 2, the collection of amplitudes of the light beams transmitted through, or equivalently reflected from, plane 120 may be represented by the product of the Fourier transform of the input sequence, F(ω), and the complex conjugate of the Fourier transform of the nth reference sequence pattern, $F^*_n(\omega)$. ω represents the spatial frequency variable. The dc components of the input diffraction patterns formed on plane 120 may be blocked to improve discrimination, and this may be done, for example, by darkening selected areas of plane 120 to prevent light from being transmitted through those areas. In particular, the dc component can be blocked to ultimately improve the accuracy of the correlation measurements.

With reference again to FIG. 1, a second lens assembly 124, preferably comprising a cylindrical lens 126 and a spherical lens 130 used in any order, is used to form on plane 132 the desired correlation of each separate light beam, or channel, transmitted through plane 120. Plane 132 is thus referred to as the output correlation plane.

For a given channel, the correlation between the input DNA sequence and the nth reference sequence is presented in the horizontal direction in plane 132, along the $x_c$-axis thereof. The output of plane 132 is transmitted to and is incident on a detector 134, such as a CCD camera, which generates a respective one electric signal or pattern representing the amplitude of the light in each channel incident on the detector. In this way, detector 134 converts the optical correlation patterns on plane 132 into equivalent electronic patterns.

With the above described arrangement, the output signals of detector 134 are proportional to the square of the correlation function—that is, the degree to which the image representing the input DNA sequence correlates with the image of the nth reference sequence onto which the former image is projected on plane 122. This feature, which is the consequence of operating with the amplitude of coherent light, can improve the signal-to-noise ratio of the correlation output of detector 134.

The conjugate Fourier transform patterns, $F^*_n(\omega)$, contained in plane 120 may be formed in any suitable manner. For example, these patterns may be formed holographically, using well-known procedures, as matched spatial filters. Alternately, the Fourier transform patterns can be superposed onto a sinusoidal fringe pattern as $F^*_n(\omega).\cos(\omega_o)$, where $\omega_o$ is the fringe frequency. Preferably, the calculations and procedures needed to form either the holographic matched filters or the fringe pattern superpositions in plane 120 are performed as a preprocessing step, prior to operation of correlation system 100, and even more preferably, prior to positioning plane 120 in system 100.

If real time processing is not desired, or if a limited set of input DNA sequences are to be processed, the spatial filters formed in plane 120 could be stored photographically. If real time processing is desired, these spatial filters may be optically stored in, for example, photosensitive crystals such as lithium niobate.

To circumvent the need to calculate the Fourier transforms of the set of n-reference sequences, particularly when n is extremely large, it may be preferred to encode the images representing the n-reference sequences directly in input plane 106 as n-channels, and to place n identical replications of the Fourier transform of the images representing the unknown or input sequence in plane 120.

The optical system 100 of FIG. 1 may also be used as a single channel correlator system to process long DNA sequences. To do this, the reference DNA sequence data is encoded in input plane 106 on a multitude of lines. To avoid missing correlations caused by this multiple line format, a number of bases of the reference DNA sequence may be repeated at the beginning of each line of the recording. This number of bases that are repeated at the beginning of each line is equal to the number of bases in the input DNA sequence. For example, if the reference DNA sequence has 1000 bases, and the input DNA sequence has 100 bases, the reference DNA sequence may be encoded over five lines in plane 106. In the first line, bases 1–300 of the reference sequence may be encoded, and bases 201–500 may be encoded in the second line. Bases 401–700 may be encoded in the third line, bases 601–900 may be encoded in the fourth line, and bases 801–1000 may be encoded in the fifth line. As in the above discussed operation of system 100, the Fourier transform of the unknown or input DNA sequence is replicated n times in plane 120.

Figure 3:
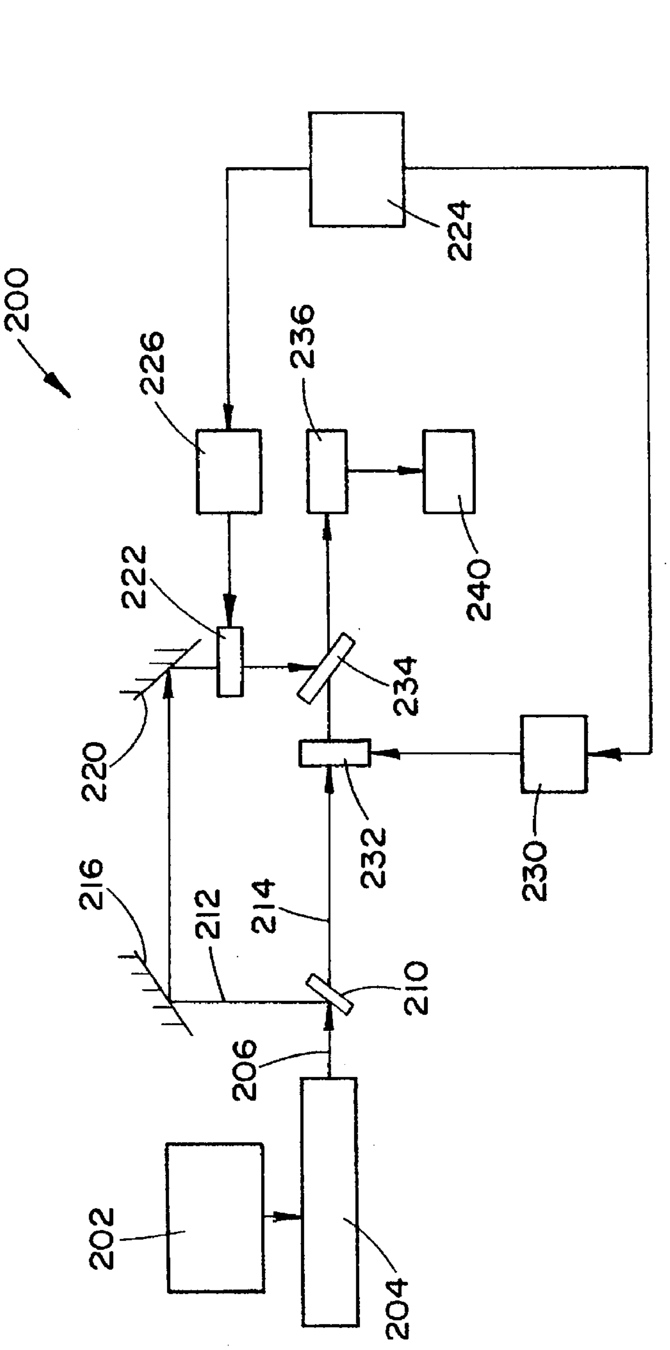
FIG. 3 is a schematic diagram of an acousto-optical system embodying the present invention.

FIG. 3 discloses an alternate optical correlator system or configuration 200, employing acousto-optic cells, that may also be used to search a data base for a DNA sequence that matches a given or input DNA sequence. In system 200, a magnetic field is applied to the active medium of a laser to induce Zeeman splitting of the wavelength of the laser beam emitted from the laser. Thus, the emerging laser beam contains two oscillation frequencies, $f_o$ and $f_o+\Delta f$, that are oppositely polarized. The difference, $\Delta f$, between the frequencies of these two oscillation frequencies depends upon the strength of the applied magnetic field and may be varied or adjusted by changing that magnetic field strength.

More specifically, in system 200, means 202 is employed to generate a magnetic field that is applied to laser medium 204, and this magnetic field causes beam 206 emitted from the laser medium to have dual frequencies, $f_o$ and $f_o+\Delta f$. Since the component beams of beam 206 are oppositely polarized, a polarization selective beam splitter 210 is used to separate the components of beam 206 into two separate light beams 212 and 214, one oscillating at a frequency of $f_o$ and the other oscillating at a frequency of $f_o+\Delta f$. Beam splitter 210 also directs these two beams 212 and 214 onto separate paths. Mirrors 216 and 220 are employed to direct beam 212 onto an acousto-optic modulator 222.

Information identifying or representing the DNA sequences to be processed—that is, both the reference and the input DNA sequences—is stored in a data bank 224, and for example, each sequence may be stored in the data bank in the form of a string of voltage values, with each of the base nucleotides A, C, G, and T represented by a respective one voltage value. Data that represent the reference DNA sequences, and in the form of electric output signals, are generated and conducted by bank 224 to electronic drive component 226, which acts as an interface between the data bank and acousto-optic cell 222. In particular, in response to the signals from data bank 224, drive 226 generates output signal suitable for activating the acousto-optic cell 222 in the desired manner. The output signals from drive 226 are conducted to and actuate cell 222; and the light beam 212 transmitted through cell 222, which preferably is the beam oscillating at the higher frequency $f_o+\Delta f$, is thereby modulated by cell 222.

A similar procedure may be used to modulate beam 214, which oscillates at a frequency $f_o$. In particular, data bank 224 transmits a second signal, representing the unknown or given DNA sequence, to electronic drive component 230, and the output of drive component 230 then activates acousto-optic cell 232. Light beam 214, which is directed to modulator 232 from beam splitter 210, is transmitted through cell 232, and is thereby modulated. Data bank 224 may be provided with timing means to control the timing of the output signals therefrom so that the modulators 222 and 232 are modulated by the signals from drivers 226 and 230 at the desired times. Alternately, separate timing means may be provided to control the timing of the modulation of light beams 212 and 214 by acousto-optic cells 222 and 232.

From cells 222 and 232, beams 212 and 214 are directed to beam combiner 234, which recombines the beams and directs the recombined beam onto detector array 236. Detector array 236 generates two electric output signals, one at a frequency of $f_o$ and one at a frequency of $f_o+\Delta f$, representing, respectively, the intensities of the light beams 212 and 214 incident on the detector array.

The electric signals generated by detector array 236 are conducted to electronic filter 240. Filter 240 is tuned to the frequency difference $\Delta f$ and responds to a signal whose strength is proportional to the product of the modulated signal amplitudes transmitted from the cells 222 and 232. Since the filter 240 transmits only the component of the incident signal oscillating at the frequency $\Delta f$, the output of the filter thus provides the correlation values, free of the dc, or pedestal, bias level.

The light intensity, I, of the recombined light beams 212 and 214, after beam combiner 234 recombines the beams, is given by the equation:

$$I = [A(t+z/v)\exp\{jf_o t\} + B(t-z/v)\exp\{j(f_o+\Delta f)t\}]^2 \qquad (1)$$
$$I = A^2 + B^2 + 2AB\cos(\Delta f t)$$

where,

A(t) and B(t) represent the signals applied to the acousto-optic cells,

T is the correlator integration time, v is the acoustic speed of propagation, and z is the distance along the acousto-optic cell.

The correlation, S(T,z), between the input and reference sequences is the time integral of I. The integration can be simplified because $\Delta f$ can, within limits, be made arbitrarily high compared to the reciprocal, 1/T of the integration time, and for example, $\Delta f$ may be of the order of magnitude of tens of megahertz. Because of this, the tuned filter 240 will block the slowly varying $A^2+B^2$ term of equation (1). Hence, the final output of filter 240 will be the correlation signal:

$$S(T,z) = \int A(t+z/v)B(t-z/v)dt \qquad (2)$$

Figure 4:
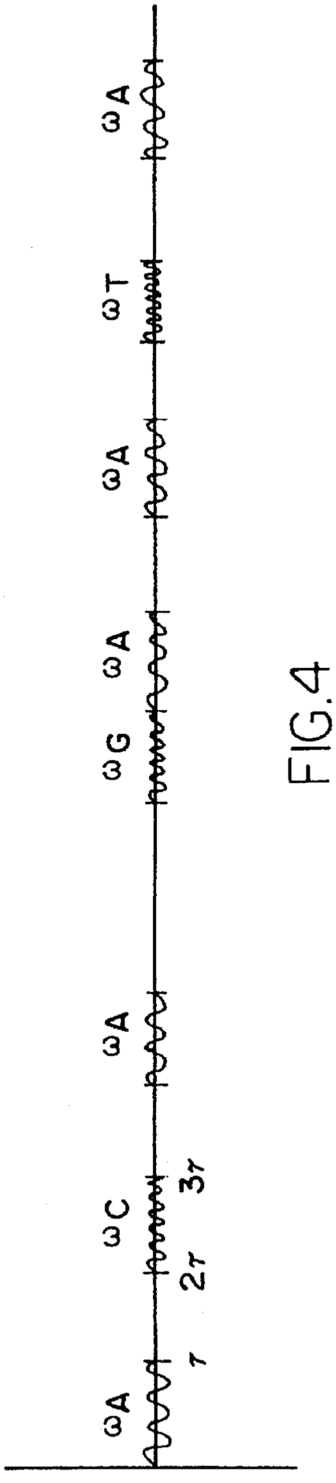
FIG. 4 shows sine wave pulses that may be used to encode DNA sequences.

FIG. 4 illustrates one manner in which the nucleotide bases A, C, G and T may be represented or encoded. In particular, FIG. 4 shows a sine wave modulated pulse train containing eight sine wave pulses. Five of these pulses, labelled "$\omega_A$" represent A nucleotides; and for illustration purposes, FIG. 4 also includes a respective one pulse, labelled "$\omega_c$, $\omega_G$, or $\omega_T$" respectively, representing each of the C, G, and T nucleotides.

In the following discussion, $\omega_A$ and $\tau_A$ represent the frequency and time duration of the A pulse, and $\omega_C$ and $\tau_C$ represent the frequency and time duration of the C pulse. Likewise, $\omega_G$ and $\tau_G$ represent the frequency and time duration of the G pulse, and $\omega_T$ and $\tau_T$ represent the frequency and time duration of the T pulse. Also, $\tau_A$ will be considered greater than or equal to $\tau_C$, $\tau_C$ will be considered greater than or equal to $\tau_G$, and $\tau_G$ will be considered greater than or equal to $\tau_T$—that is:

$$\tau_A \geqq \tau_C \geqq \tau_G \geqq \tau_T$$

Consider a DNA sequence, where N is equal to the total number of base spaces in the sequence, and $N_A$, $N_C$, $N_G$, and $N_T$ are equal to the total number of A, C, G, and T nucleotides respectively, in the DNA sequence. Thus, $$N_A+N_C+N_G+N_T \leqq N \quad (3)$$

$N_A+N_C+N_G+N_T$ is equal to N if there are no blank spaces in the DNA sequence.

A particular pulse for the A nucleotide may be expressed as:

$$f_n(t)=\sin(\omega_A t, \text{ when } n\tau_A \leqq t \leqq (n+1)\tau_A \quad (4)$$

$$f_n(t)=0, \text{ otherwise}$$

where the integer n defines the location of that particular pulse.

The Fourier transform, $F_n(\omega)$, of equation (4) is:

$$F_n(\omega) = \int_{n\tau_A}^{(n+1)\tau_A} \sin(\omega_A t)\exp(-j\omega t)dt \quad (5)$$

$$= \frac{1}{2j}\int \exp\{-j(\omega-\omega_A)t\}dt - \frac{1}{2j}\int \exp\{-j(\omega+\omega_A)t\}dt \quad (6)$$

Performing the integration and simplifying the result shows that:

$$F_n(\omega) \approx \exp\{-j(\omega-\omega_A)\tau_A/2\}[\tau_A/2]\mathrm{sinc}\{(\omega-\omega_A)\tau_A/2\}\exp[-j(\omega-\omega_A)n\tau_A] - \exp\{-j(\omega+\omega_A)\tau_A/2\}[\tau_A/2]\mathrm{sinc}\{(\omega+\omega_A)\tau_A/2\}\exp[-j(\omega+\omega_A)n\tau_A] \quad (7)$$

Summing over all A pulses in the interval $N\tau_A$, shows that:

$$S_A(\omega) = \Sigma F_n(\omega) \approx \exp\{-j(\omega-\omega_A)\tau_A/2\}[\tau_A/2]\mathrm{sinc}\{(\omega-\omega_A)\tau_A/2\}\Sigma\exp[-j(\omega-\omega_A)n\tau_A] - \exp\{-j(\omega+\omega_A)\tau_A/2\}[\tau_A/2]\mathrm{sinc}\{(\omega+\omega_A)\tau_A/2\}\Sigma\exp[-j(\omega+\omega_A)n\tau_A] \quad (8)$$

where the sums are over all $N_A$ terms.

If $\omega_A$ is chosen so that it equals $\omega$, that is, $\omega=\omega_A$, then $$S_A(\omega_A) \approx N_A[\tau_A/2] - \exp\{-j(\omega_A\tau_A)\}[\tau_A/2]\mathrm{sinc}\{(2\omega_A\tau_A/2)\}\Sigma\exp[-j(2\omega_A\tau_A n)] \quad (9)$$

The first term on the right side of equation (9) is the total number of A nucleotides in the given interval $N\tau_A$. The second term on the right side of equation (9) may be considered as noise like and can be eliminated with a particular choice for $\omega_A\tau_A$. Thus, the term of particular interest on the right side of equation (9) to achieve this elimination is the sinc term. This term may be expanded, using basic trigonometric identity equations, as follows:

$$\mathrm{sinc}\{(2\omega_A\tau_A/2)\}=2\sin\omega_A\tau_A/2\cos\omega_A\tau_A/2 \quad (10)$$

This sinc term may thus vanish if either $$\sin\frac{\omega_A\tau_A}{2}=0 \quad (11a)$$

or $$\cos\frac{\omega_A\tau_A}{2}=0 \quad (11b)$$

$$\sin\frac{\omega_A\tau_A}{2}$$

may be set equal to zero when $$\frac{\omega_A\tau_A}{2}=k_A\pi,$$

where $k_A$ is a positive or negative inter—that is, $k_A \neq 0$ and $k_A = \pm 1, \pm 2, \pm 3, \ldots$ In this case, $\omega_A\tau_A=2k_A\pi$.

$$\cos\frac{\omega_A\tau_A}{2}$$

may be set equal to zero by setting $$\frac{\omega_A\tau_A}{2}=(2k_A-1)\frac{\pi}{2},$$

where $k_A=0, \pm 1, \pm 2, \pm 3, \ldots$

In this case, $\omega_A\tau_A=(2k_A-1)\pi$.

Thus, whenever $\omega_A\tau_A$ is an integer multiple of $\pi$, then the sinc term in equation (10) vanishes and, from equation (9), $$S_A(\omega_A)=N_A\frac{\tau_A}{2} \quad (12a)$$

In a similar manner, sums, $S_c(\omega_c)$, $S_G(\omega_G)$ and $S_T(\omega_T)$ may be obtained over all the C, G, and T pulses, respectively, in the DNA sequence. In particular, $$S_C(\omega_C)=N_C\frac{\tau_C}{2}, \quad (12b)$$

when $\omega = \omega_C$ and $\omega_C\tau_C$ is an integer multiple of $\pi$, $$S_G(\omega_G)=N_G\frac{\tau_G}{2}, \quad (12c)$$

when $\omega = \omega_G$ and $\omega_G\tau_G$ is an integer multiple of $\pi$, and $$S_T(\omega_T)=N_T\frac{\tau_T}{2}, \quad (12d)$$

when $\omega_T = \omega_T$ and $\omega_T\tau_T$ is an integer multiple of $\pi$.

For a DNA sequence that contains an array of A, C, G, and T nucleotides, the Fourier transform, $S(\omega)$, of the array is the sum of the Fourier transforms of the four base nucleotides. Hence, $$S(\omega)=S_A(\omega)+S_c(\omega)+S_G(\omega)+S_T(\omega). \quad (13)$$

At the four frequencies of interest, $$S(\omega_A)=N_A[\tau_A/2]+S_c(\omega_A)+S_G(\omega_A)+S_T(\omega_A) \quad (14a)$$

$$S(\omega_C)=S_A(\omega_C)+N_C[\tau_A/2]+S_G(\omega_C)+S_T(\omega_C) \quad (14b)$$

$$S(\omega_G)=S_A(\omega_G)+S_c(\omega_G)+N_G[\tau_A/2]+S_T(\omega_G) \quad (14c)$$

$$S(\omega_T)=S_A(\omega_T)+S_C(\omega_T)+S_G(\omega_T)+N_T[\tau_A/2] \quad (14d)$$

In all cases, it is preferred to eliminate all but the terms that count the number of nucleotides in the DNA sequence.

If all the τ's are equal, then $$\omega_A\tau=k_A\pi, \quad (15a)$$

$$\omega_C\tau=k_C\pi, \quad (15b)$$

$$\omega_G\tau=k_G\pi, \text{ and} \quad (15c)$$

$$\omega_T\tau=k_T\tau \quad (15d)$$

The quantities $S_C(\omega_G)$ and $S_A(\omega_C)$ contain sinc functions of the form $\text{sinc}\{(\omega_C\pm\omega_A)\tau/2\}$ and $\text{sinc}\{(\omega_A\pm\omega_C)\tau/2\}$.

Both of these sinc terms vanish if $(\omega_A\pm\omega_C)2/\tau$ is properly chosen.

Similarly, all other unwanted sinc terms in the components of equations (14a)–(14d) will vanish if the terms $$(\omega_G\pm\omega_A)\tau/2, \quad (16a)$$

$$(\omega_T\pm\omega_A)\tau/2, \quad (16b)$$

$$(\omega_G\pm\omega_C)\tau/2, \quad (16c)$$

$$(\omega_T\pm\omega_C)\tau/2, \quad (16d)$$

$$\text{and } (\omega_T\pm\omega_G)\tau/2, \quad (16e)$$

are also appropriately chosen. For example, the unwanted sinc terms in the components of equations (14a)–(14d) will vanish if each of the terms (16a)–(16e) are set equal to an integer multiple of π: That is, $$(\omega_A\pm\omega_C)\tau/2=(\text{integer})\tau \quad (17a)$$

$$(\omega_G\pm\omega_A)\tau/2=(\text{integer})\pi \quad (17b)$$

$$(\omega_T\pm\omega_A)\tau/2=(\text{integer})\pi \quad (17c)$$

$$(\omega_G\pm\omega_C)\tau/2=(\text{integer})\pi \quad (17d)$$

$$(\omega_T\pm\omega_C)\tau/2=(\text{integer})\pi \quad (17e)$$

$$(\omega_G\pm\omega_G)\tau/2=(\text{integer})\pi \quad (17f)$$

From equations (15a–15d), $\omega_A$, $\omega_C$, $\omega_G$, and $\omega_T$ can be expressed as follows:

$$\omega_A=\frac{k_A\pi}{\tau} \quad (18a)$$

$$\omega_C=\frac{k_C\pi}{\tau} \quad (18b)$$

$$\omega_G=\frac{k_G\pi}{\tau} \quad (18c)$$

$$\omega_T=\frac{k_T\pi}{\tau} \quad (18d)$$

Substituting the right hand sides of equations (18a)–(18d) for $\omega_A$, $\omega_C$, $\omega_G$, and $\omega_T$, respectively, in equations (17a)–(17e) shows that the constraints of equations (17a)–(17e) become:

$$(\omega_A\pm\omega_C)\frac{\tau}{2}=\left(\frac{k_A\pi}{\tau}\pm\frac{k_C\pi}{\tau}\right)\frac{\tau}{2}=(\text{integer})(\pi) \quad (19a)$$

$$(\omega_G\pm\omega_A)\frac{\tau}{2}=\left(\frac{k_G\pi}{\tau}\pm\frac{k_A\pi}{\tau}\right)\frac{\tau}{2}=(\text{integer})(\pi) \quad (19b)$$

-continued $$(\omega_T\pm\omega_A)\frac{\tau}{2}=\left(\frac{k_T\pi}{\tau}\pm\frac{k_A\pi}{\tau}\right)\frac{\tau}{2}=(\text{integer})(\pi) \quad (19c)$$

$$(\omega_G\pm\omega_C)\frac{\tau}{2}=\left(\frac{k_G\pi}{\tau}\pm\frac{k_C\pi}{\tau}\right)\frac{\tau}{2}=(\text{integer})(\pi) \quad (19d)$$

$$(\omega_T\pm\omega_C)\frac{\tau}{2}=\left(\frac{k_T\pi}{\tau}\pm\frac{k_C\pi}{\tau}\right)\frac{\tau}{2}=(\text{integer})(\pi) \quad (19e)$$

$$(\omega_T\pm\omega_G)\frac{\tau}{2}=\left(\frac{k_T\pi}{\tau}\pm\frac{k_G\pi}{\tau}\right)\frac{\tau}{2}=(\text{integer})(\pi) \quad (19f)$$

Simplifying equations (19a)–(19e) produces the following results:

$$k_A\pm k_C=2(\text{integer}) \quad (20a)$$

$$k_G\pm k_A=2(\text{integer}) \quad (20b)$$

$$k_T\pm k_G=2(\text{integer}) \quad (20c)$$

$$k_G\pm k_C=2(\text{integer}) \quad (20d)$$

$$k_T\pm k_C=2(\text{integer}) \quad (20e)$$

$$k_T\pm k_G=2(\text{integer}) \quad (20f)$$

if we let $k_C\pm k_A=K_{CA}$, $k_G\pm k_A=K_{GA}$, $k_T\pm k_A=K_{TA}$, $k_G\pm k_C=K_{GC}$, $k_T\pm k_C=K_{TC}$, and $k_T\pm k_G=K_{TG}$, then equations (20a)–(20e) become:

$$K_{AC}=2(\text{integer}) \quad (21a)$$

$$K_{GA}=2(\text{integer}) \quad (21b)$$

$$K_{TA}=2(\text{integer}) \quad (21c)$$

$$K_{GC}=2(\text{integer}) \quad (21d)$$

$$K_{TC}=2(\text{integer}) \quad (21e)$$

$$K_{TG}=2(\text{integer}) \quad (21f)$$

Thus, $K_{CA}$ etc. are even integers.

Table I illustrates one choice for the k values that will produce the desired results—that is, all of the sinc terms in the components of equations (10a)–(10d) will vanish.

TABLE I

| | | | |
|---|---|---|---|
| $k_A = 2$ | $k_C = 4$ | $k_G = 6$ | $k_T = 8$ |

With this choice of k values, the K values are:

TABLE II

| | | |
|---|---|---|
| $K_{CA} = 2$ or 6 | $K_{GA} = 4$ or 8 | $K_{TA} = 6$ or 10 |
| $k_{GC} = 2$ or 10 | $K_{TC} = 4$ or 12 | $k_{TG} = 2$ or 14 |

It should be noted that the k values and the derived K values, can be uniformly increased by a common integral multiplier. Hence, for example, the following choice for the k values will also produce the desired result:

| | | | |
|---|---|---|---|
| $k_A = 20$ | $k_C = 40$ | $k_G = 60$ | $k_T = 80$ |

The larger the values for the k terms, the narrower will be the full width at half maximum of the Fourier transform of the sine pulse—that is, in the Fourier transform of the sine pulse that represents a nucleotide base, the width of the wave having the maximum amplitude, as measured at half that maximum amplitude, decreases as the k-terms increase.

With the above selections for the k values, the Fourier transforms of the four frequencies become:

$$S(\omega_A)=N_A,\ S(\omega_C)=N_C,\ S(\omega_G)=N_G,\ S(\omega_T)=N_T,$$

Thus, the Fourier transform of a sequence evaluated at appropriated frequencies, will result in a count of the number of nucleotides in that sequence.

If the sequence can be processed in its entirety—which can be done if the sequence can be completely contained within the input device—then the output of the system is a measure of the total count of each nucleotide. If the sequence cannot be processed at once in its entirety, then the total number of each nucleotide in the sequence can be determined by dividing the sequence into components, processing those components one at a time, and then summing the number of the respective nucleotides in each component of the sequence.

In the system discussed above, the order in which the subsets $N_A$, $N_C$, $N_G$ and $N_T$ occur is not preserved. However, this order may be preserved by identifying the relative locations of the sine pulses in the sequence.

Figure 5:
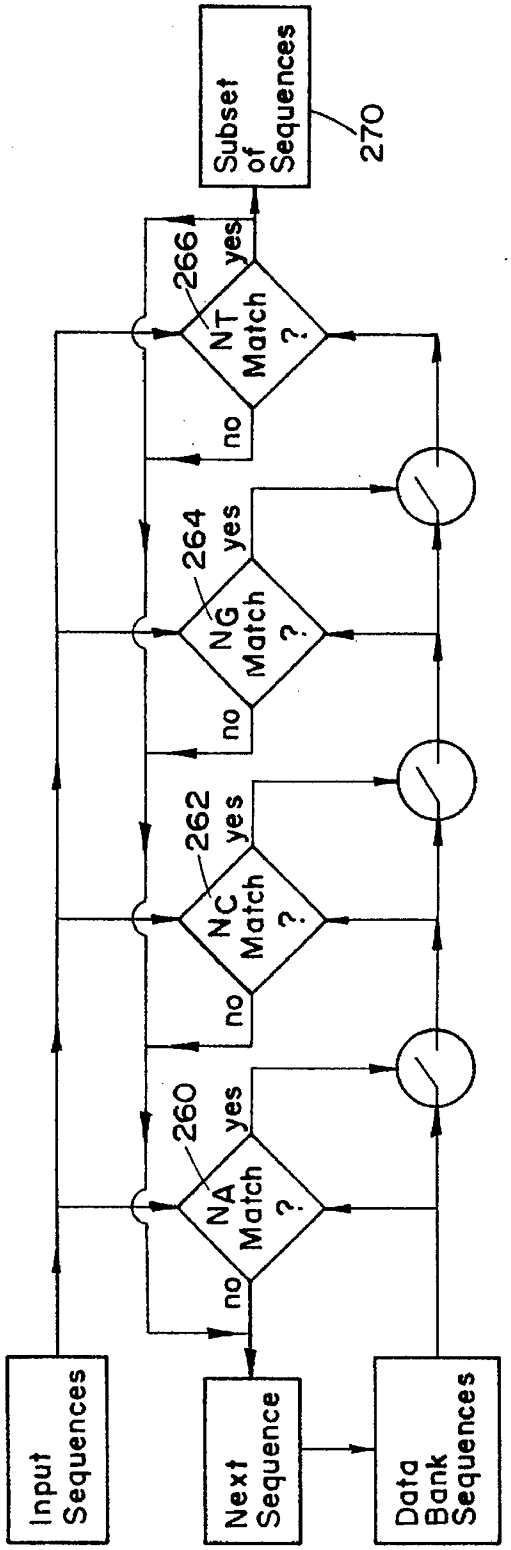
FIG. 5 schematically illustrates a first procedure for pre-sorting DNA reference sequences.

FIG. 5 schematically illustrates a procedure for searching the contents of the data bank for a sequence that matches a given or input sequence. This procedure may be performed in order to reduce the number of DNA sequences in the data bank that are to be compared, or correlated, with an input sequence.

To do this, for example, a comparison is made between the $N_A$ values for the input sequence and one sequence in the data bank, as represented by block 260. If these two $N_A$ values are not equal, then these two sequences do not match, and then the $N_A$ values for the input sequence and a second reference sequence in the data bank are compared. This comparison of the $N_A$ values is repeated until a reference sequence is found having an $N_A$ value equal to the $N_A$ value of the input sequence.

When a reference sequence is found having an $N_A$ value equal to the $N_A$ value of the input sequence, then the $N_C$ values of these two sequences are compared, as represented by block 262. If these two $N_C$ values are not equal, then the two sequences do not match. The procedure returns to block 260, and a comparison is made between the $N_A$ values for the input sequence and the next sequence in the data bank. If these two $N_A$ values do not match, the $N_A$ value of the input sequence is then compared to the $N_A$ value of the next sequence in the data bank. This comparison of the $N_A$ values is again repeated until another reference sequence is found having a matching or equal $N_A$ value; and once this occurs, the $N_C$ values of the two DNA sequences are compared.

Once a match of $N_C$ values is found, a comparison of $N_G$ values is made, as represented by block 264. If the $N_G$ values of the input and reference sequences are not equal, then the process returns to block 260 and continues on from there. However, if the $N_G$ values of these two sequences match, then the procedure moves on to compare the $N_T$ values of the input and reference sequences, as represented by block 266. If these two $N_T$ values are not equal, then the process returns to block 260 and continues on from there. If these two $N_T$ values are equal, then the reference sequence, or information identifying that sequence, is entered or stored in memory 270. After this, the procedure returns to block 260 and begins again, comparing the $N_A$ values of the input sequence to another reference sequence in the data bank.

The above-discussed procedure continues until all of the reference sequences in the data bank have been processed. More specifically, the procedure continues until each reference sequence has been either (i) entered or identified in memory 270 as a possible matching reference sequence, or (ii) determined to not match the input sequence because one of the $N_A$, $N_C$, $N_G$ and $N_T$ values of the reference sequence has been found to be unequal to the corresponding N value of the input sequence.

In the above process, the values of $N_A$, $N_C$, $N_G$ and $N_T$ for the input sequence and for all of the reference sequences are known or are determined as a preprocessing step.

Figure 6:
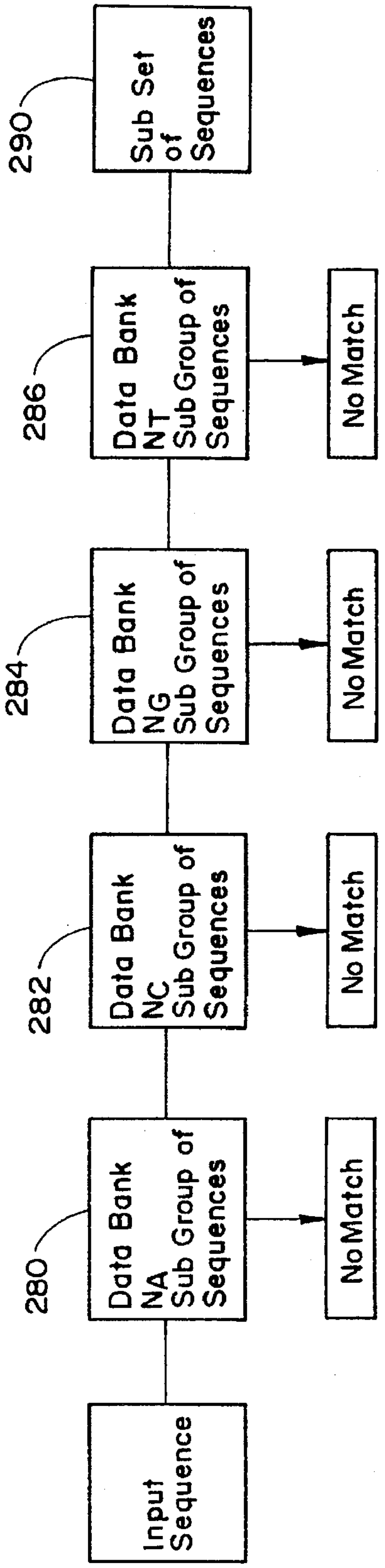
FIG. 6 schematically illustrates a second procedure for pre-sorting DNA reference sequences.

FIG. 6 generally illustrates an alternate preliminary searching technique. With this procedure, the reference sequences in the data bank may be arranged or grouped according to their $N_A$ values, and then in accordance with their $N_C$, $N_G$ and $N_T$ values. In this case, the search, as represented by block 280, is directed to a specific $N_A$ group. Once that group is found, that group is then searched for a specific $N_C$ subgroup, as represented by block 282. That subgroup, if found, is then searched for a particular $N_G$ subgroup, as represented by block 284; and if such an $N_G$ subgroup is found, it is searched for a specific $N_T$ subgroup, as represented by block 286. When a reference sequence is found having $N_A$, $N_C$, $N_G$ and $N_T$ values equal to the $N_A$, $N_C$, $N_G$ and $N_T$ values, respectively, of the input sequence, that reference sequence is identified in memory 290.

For instance, the reference sequences in the data bank may be arranged in an increasing order of their $N_A$ values, and the sequences in each group of equal $N_A$ values may then be arranged in the order of their $N_C$ values. Each group of sequences having equal $N_A$ and $N_C$ values may be arranged in the order of their $N_G$ values; and each group of sequences having equal $N_A$, $N_C$ and $N_G$ values may be arranged in the order of their $N_T$ values.

As will be understood by those of ordinary skill in the art, in both of the procedures discussed above, it is not necessary that the $N_A$ values of the reference sequences be tested first, and the $N_A$, $N_C$, $N_G$, and $N_T$ values of the reference sequences may be tested in any order.

The reference sequences identified or listed in memories 270 and 290 have N values that match the N values of the input or given sequence. The above-discussed procedures do not test the ordering or arrangement of the nucleotides in the reference sequences, however; and the ordering or arrangement of the nucleotide in the sequences listed in memories 270 and 290 may thus differ from the ordering of the nucleotide in the input sequence. Hence, the next step in the searching process is to use one of the correlation methods discussed above in connection with FIGS. 1 through 3, to determine if any of the reference sequences listed or identified in memories 270 and 290 is identical to the input sequence and, if so, to identify that reference sequence.

Figure 7:
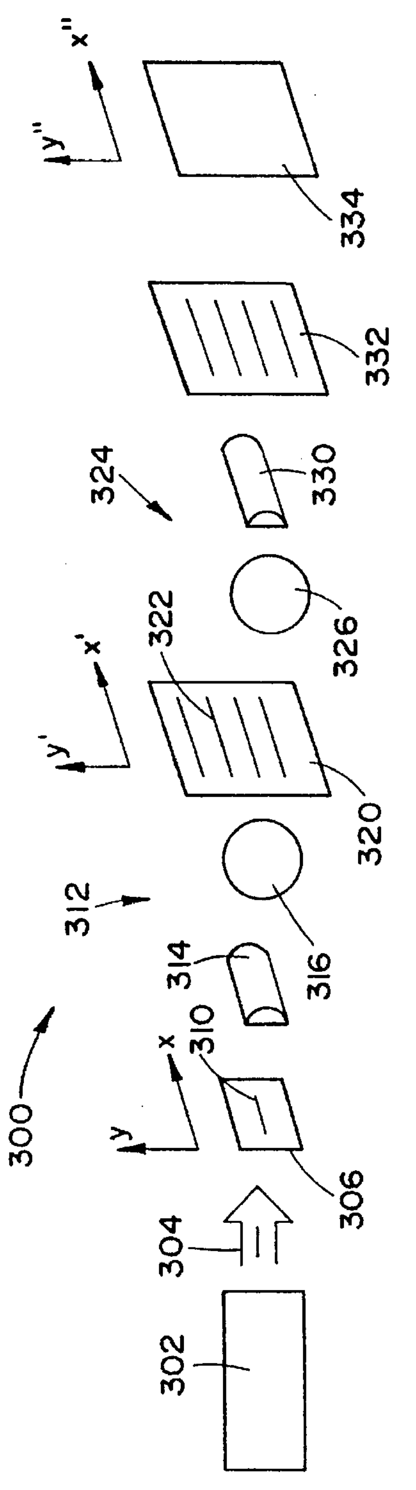
FIG. 7 is a schematic diagram of an alternate optical correlator system embodying this invention.

FIG. 7 shows another system 300 that may be used to correlate input and reference DNA sequence; and, more particularly, this Figure shows optical system 300, in which a large number of reference patterns may be simultaneously compared with an input pattern. In system 300, a laser 302 generates laser beam 304 and transmits the beam through an input means 306 that is provided or encoded with a pattern or image 310 representing the input DNA sequence. Any suitable laser 302 and any suitable input means 306 may be used in system 300, and for example, the input means may be an acousto-optic modulator or a film transparency.

A lens assembly 312, preferably comprising a cylinder lens 314 and a spherical lens 316 positioned in any arrangement with respect to each other, is utilized to project an image of the input pattern onto a plane 320. With the preferred embodiment of system 300, lens assembly 312 is designed to enlarge the input image differently in the y'-direction from the enlargement in the x'-direction. For example, the image may be magnified by a factor of one in the x'-direction, whereas the magnification in the y'-direction may be sufficient to extend the input image over the complete useful extent or height of the plane 320 in the y'-direction. In addition, preferably the input pattern is swept across plane 320 in the y'-direction by any suitable means (not shown) such as an acousto-optic cell or rotating mirrors.

An array of patterns 322 or images representing the reference DNA sequences are contained or encoded in plane 320, preferably as a multiple recording on a photographic medium or other equivalent means. Preferably, each reference pattern 322 extends in the x'-direction of plane 320, and the individual reference patterns are spaced apart and ordered in the y'-direction of plane 320. In this way, the reference patterns form or are contained in separate channels that are spaced apart in the y'-direction of plane 320.

The image of the input pattern is projected onto all of the reference pattern channels in plane 320 in an equal and uniform manner. The light transmitted through the nth reference pattern recorded in plane 320 is proportional to the product $$f(x-x_s)f_{Rn}(x), \tag{22}$$

where $f_{Rn}(x)$ represents the nth reference pattern, and $x_s$ represents the time varying shift in the input pattern.

A further lens assembly 324, preferably comprising spherical lens 326 and cylinder lens 330 positioned in any arrangement with respect to each other, is employed to project the light transmitted through plane 320 onto an output plane 332. The light distribution on output plane 332 is a one-dimensional Fourier transform and is proportional to:

$$J_n(x'_s, x'')=\int f(x'-x'_s)f_{Rn}(x')exp(jx''x')dx \tag{23}$$

for each of the n-channels contained in plane 320.

Preferably, the n-channel output light distributions from plane 320 are also presented as a channelled distribution in the y"-direction of plane 332. The spatial frequency variable ω is proportional to the x"-direction in plane 332.

At x"=0, the integral, equation (23), becomes a measure of the correlation between the input pattern and each one of the n-reference patterns, and the peak value of this correlation integral indicates the value of $x_s$ for which the correlation is a maximum.

Secondary maxima may be present that indicate relatively high correlations between the input and reference patterns. Information about these secondary maxima—and the associated reference patterns—may be useful in analyzing the input or given DNA sequence. It should be noted that the correlation integral, equation (23), may have several maxima, as well as several secondary maxima.

The output light from plane 332, which is in the form of n-distributed channels, is directed onto photosensor 334, which then generates output signals representing or indicating the intensity of the light in each channel incident on the sensor. Any suitable sensor 334 may be employed in system 300; and, for instance, sensor may comprise a conventional or standard CCD array.

Figure 8:
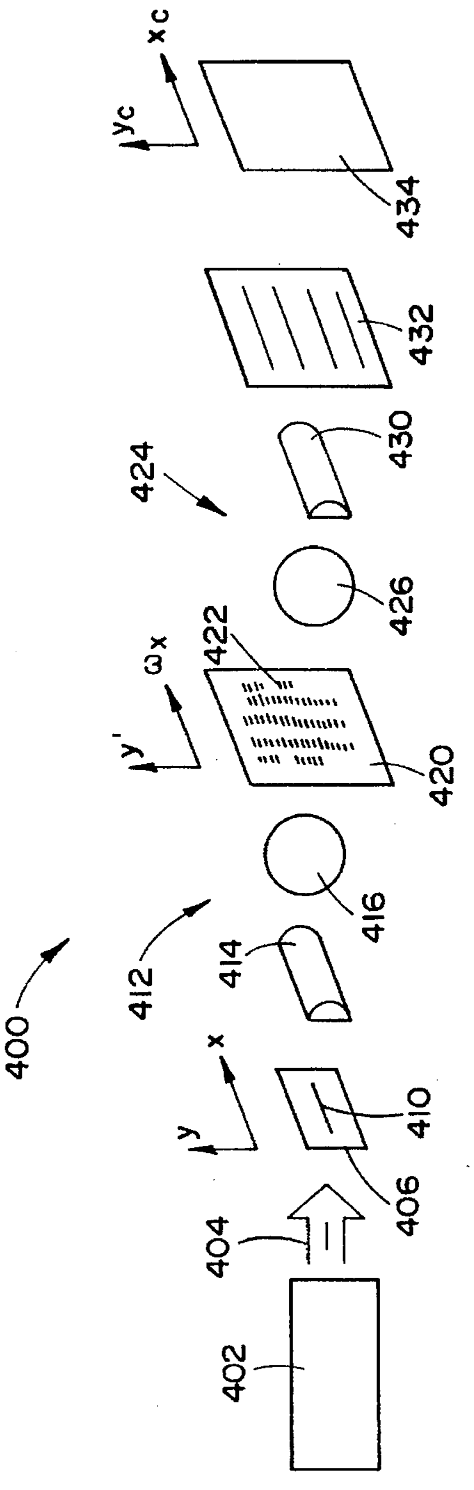
FIG. 8 is a schematic diagram of another alternate optical correlator system embodying the present invention.

FIG. 8 shows another optical system 400 also having multichannel processing capabilities. With system 400, laser 402 generates laser beam 404 and directs that beam through input means 406 that is provided with input pattern 410. Any suitable laser 402 and any suitable input means 406 may be used in system 400, and, for example, the input means may be an acousto-optic modulator or a film transparency.

A lens assembly 412, preferably comprising cylinder lens 414 and spherical lens 416 positioned in any arrangement with respect to each other, is positioned to project an image of the input pattern 410 onto plane 420. In system 400, lens assembly 412 forms a one-dimensional Fourier transform of the input pattern in the $\omega_x$ direction of plane 420; however, the lens assembly 412 also images the input distribution in the y-direction of plane 406 onto dedicated channels in the y'-direction of plane 420. In addition, the input pattern is swept across plane 420 by any suitable means (not shown).

An array of reference patterns 422 are also contained in plane 420, preferably as a multiple recording on a photographic medium or other equivalent means. Preferably, each reference pattern 422 extends in the y'-direction of plane 420, and the reference patterns are spaced apart and ordered in the $\omega_x$ direction of plane 420. Thus, the reference patterns are contained in separate channels that are spaced apart in the $\omega_x$ direction of plane 420. In particular, the n-reference patterns stored in plane 420 are the Fourier transform distributions of each individual reference pattern, $F_{Rn}\omega_x$, separated into n channels in the y'-direction.

The intensity of the light transmitted from each channel of plane 420 is given by an equation of the form $$F(\omega_x)F_{Rn}(\omega_x) \tag{24}$$

where $F(\omega_x)$ and $F_{Rn}$ are the Fourier transforms, respectively, of the input pattern and of the nth reference pattern.

A lens assembly 424, preferably comprising spherical lens 426 and cylinder lens 430 positioned in any arrangement with respect to each other, projects the light transmitted through plane 420, onto an output plane 432. The light distribution on plane 432 is a one-dimensional Fourier transform and, for each of the n-channels contained in plane 420, is proportional to:

$$C_n(X_c,X_s)=\int F(\omega_x)F_{Rn}(\omega_x)exp(j\omega X_c)d\omega \tag{25}$$

where $X_c$ is a coordinate in plane 432.

The output light from plane 432, which is in the form of n-distributed channels, is directed onto photosensor 434, which then generates output signals representing or indicating the intensity of the light in each channel incident on the sensor. Sensor 434, also, may be comprised of any suitable sensor, and for example, a conventional CCD array may be used as sensor.

As an added feature of system 400, the light distribution centered about $\omega_x$=0 may be blocked in plane 420. This, in effect, removes any dc component of the input and reference functions and, consequently, enhances the maxima of the correlation output signals.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of searching a data base for a given sequence, the data base having a multitude of reference sequences stored therein, the method comprising:

forming a multitude of optical diffraction patterns representing the reference sequences in a first optical medium;

forming a multitude of optical diffraction patterns in a second optical medium, each of the optical diffraction patterns in the second optical medium representing the given sequence;

generating a coherent light beam;

modulating the coherent light beam with the optical diffraction patterns formed in the second optical medium to form a multi-channel signal beam;

further modulating the channels of said formed multi-channel signal beam with the diffraction patterns in the first optical medium to form a multi-channel correlation beam;

measuring an intensity of each channel of the correlation beam; and generating a signal when the intensity of one of the channels of the correlation beam is above a preset level to indicate that the given sequence correlates with one of the reference sequences.

2. A method according to claim 1, wherein:

the step of modulating the channels of the signal beam includes the step of using each of the diffraction patterns in the first optical medium to modulate a respective one of the channels of the signal beam.

3. A method according to claim 1, wherein the given sequence and the reference sequences are DNA sequences, and each of the DNA sequences includes a plurality of types of elements, and wherein the step of forming the multitude of optical diffraction patterns in the first optical medium includes the steps of:

assigning a respective one sine wave pattern to each of the types of elements; and for each of the elements in the reference sequences, forming an optical diffraction pattern in the first optical medium of the sine wave pattern assigned to the element.

4. A method according to claim 1, wherein the step of forming the multitude of diffraction patterns in the first optical medium includes the step of representing each of the reference sequences with a respective one of the multitude of optical diffraction patterns.

5. A method according to claim 1, wherein the step of forming the multitude of diffraction patterns in the first optical medium includes the step of representing each of the reference sequences with a respective one set of the multitude of optical diffraction patterns.

6. A method according to claim 5, wherein the diffraction patterns in each set of diffraction patterns are formed on a multitude of parallel lines on the first optical medium.

7. A method of searching a data base for a given sequence, the data base having a multitude of reference sequences stored therein, the given sequence and each of the reference sequences including a plurality of types of elements, the method comprising:

assigning a respective one data value to each of said plurality of types of elements;

for each of the given and reference sequences, storing in a memory the data values assigned to each element of each of the given and reference sequences;

generating a first light beam having a first frequency;

generating a second light beam having a second frequency;

modulating the first light beam with acoustical signals representing the data values assigned to the elements of the reference sequences;

modulating the second light beam with acoustical signals representing the data values assigned to the elements of the given sequence; and generating a correlation signal representing the correlation of the modulated first and second light beams.

8. A method according to claim 7, wherein each of the first and second modulated light beams has a respective amplitude, and the step of generating the correlation signal includes the steps of generating a signal having an amplitude proportional to the product of the amplitudes of the first and second modulated light beams.

9. A method according to claim 7, wherein the given sequence and the reference sequences are DNA sequences.

10. A method according to claim 9, wherein the step of modulating the first light beam includes the steps of:

transmitting the first light beam through a first acousto-optic cell; and driving the first acousto-optic cell to modulate the first light beam in response to data values stored in the memory and assigned to the elements of the reference sequences.

11. A method according to claim 10, wherein the step of modulating the second light beam includes the steps of:

transmitting the second light beam through a second acousto-optic cell; and driving the second acousto-optic cell to modulate the second light beam in response to data values stored in the memory and assigned to the elements of the given sequence.

12. A method according to claim 7, wherein the steps of generating the first and second light beams includes the steps of:

generating an initial light beam; and splitting the initial light beam into the first and second light beams.

13. A method according to claim 12, wherein the splitting step includes the steps of:

polarizing a first component of the initial light beam in a first orientation;

polarizing a second component of the initial light beam in a second orientation; and using a polarization selective beam splitter to split the initial light beam into the first and second light beams and to direct the first and second light beams onto first and second paths, respectively.

14. A method of searching a data base for an input sequence, the data base having a multitude of reference sequences stored therein, the input sequence and each of the reference sequences having a respective number of each of a plurality of elements, the method comprising:

identifying the reference sequences having the same numbers of each of the elements as the input sequence;

generating reference patterns representing the identified reference sequences;

generating an input pattern representing the input sequence;

modulating a first light beam with the reference patterns;

modulating a second light beam with the input pattern; and generating a correlation signal representing the correlation of the first and second modulated light beams.

15. A method according to claim 14, wherein said plurality of elements include at least first and second elements, and the identifying step includes the steps of:

searching the data base for one of the reference sequences having the same number of first elements as the input sequence; and each time one of the reference sequences is found having the same number of first elements as the input sequence, determining whether said one of the reference sequences has the same number of second elements as the input sequence.

16. A method according to claim 14, wherein said plurality of elements include at least first and second elements, and in the data base, the reference sequences are arranged in groups according to the number of first elements in the reference sequences, and in each group, the reference sequences are arranged in subgroups according to the number of second elements in the reference sequences, and wherein the identifying step includes the steps of:

searching the data base for one of the groups of reference sequences having the same number of first elements as the input sequence; and if said one of the groups of reference sequences is found, then searching through said one group of reference sequences for one of the subgroups of reference sequences having the same number of second elements as the input sequence.

17. A method of searching a data base for a given sequence, the data base having a multitude of reference sequences stored therein, the method comprising:

generating a coherent light beam;

modulating the light beam with a pattern representing the given sequence to form a modulated signal beam;

further modulating said formed modulated signal beam with reference patterns representing the reference sequences to form a multi-channel correlation beam;

measuring an intensity of each channel of the correlation beam; and generating a signal when the intensity of one of the channels of the correlation beam is above a preset level to indicate that the given sequence correlates with one of the reference sequences;

wherein the reference sequences include a plurality of types of elements, and the further modulating step includes the steps of i) assigning a respective one sine wave pattern to each of the types of elements, ii) for each of the reference sequences, forming in a first optical medium an optical diffraction pattern of the sine wave patterns assigned to the elements of the reference sequence, and iii) modulating said formed modulated signal beam with said optical diffracting patterns to form said multi-channel correlation beam.

18. A method according to claim 17, wherein the step of further modulating the formed modulated signal beam with the reference patterns further includes the step of modulating the formed modulated signal beam with one of the reference patterns at a time.

19. A method according to claim 18, wherein the step of modulating the formed modulated signal beam with the optical diffraction patterns includes the step of sweeping the formed modulated signal beam across the first optical medium.

20. A method according to claim 19, wherein the reference sequences include a plurality of types of elements, and wherein the step of forming the reference optical diffraction patterns includes the steps of:

assigning a respective one sine wave pattern to each of the types of elements; and for each of the reference sequences, forming an optical diffraction pattern in the first optical medium of the Fourier transform of the sine wave patterns assigned to the elements of the reference sequence.

21. A system for searching a data base for a given sequence, the data base having a multitude of reference sequences, the system comprising:

means to generate a coherent light beam;

means to modulate the light beam with a pattern representing the given sequence to form a modulated signal beam;

means to further modulate the modulated signal beam with reference patterns representing the reference sequences to form a multi-channel correlation beam;

means to measure an intensity of each channel of the correlation beam; and means to generate a signal when the intensity of one of the channels of the correlation beam is above a preset level to indicate that the given sequence correlates with one of the reference sequences;

wherein the means to modulate the light beam includes a first optical medium having an optical diffraction pattern formed therein and representing the given sequence; and the means to further modulate the modulated signal beam includes i) a second optical medium having a multitude of reference optical diffraction patterns formed therein and representing the reference sequences, and ii) means to modulate the signal beam with the reference patterns, at a rate of one of the reference patterns at a time to form the multi-channel correlation beam.

22. A system according to claim 21, further comprising means to select a group of the reference sequences in the data base, and wherein:

the means to modulate the signal beam with reference patterns includes means to modulate the signal beam with reference patterns representing said group of the reference sequence.

23. A system according to claim 22, wherein the input sequence and each of the reference sequences has a respective number of each of a plurality of elements, and the means to select the group of the reference sequences includes means to identify the reference sequences having the same number of each of the elements as the given sequence.

24. A system for searching a data base for a given sequence, the data base having a multitude of reference sequences, the system comprising:

means to generate a coherent light beam;

means to modulate the light beam with a pattern representing the given sequence to form a modulated signal beam;

means to further modulate the modulated signal beam with reference patterns representing the reference sequences to form a multi-channel correlation beam;

means to measure an intensity of each channel of the correlation beam; and means to generate a signal when the intensity of one of the channels of the correlation beam is above a preset level to indicate that the given sequence correlates with one of the reference sequences; wherein:

the means to modulate the light beam includes a first optical medium having an optical diffraction pattern formed therein and representing the given sequence; and the means to further modulate the modulated signal beam includes i) a second optical medium having a multitude of reference optical diffraction patterns formed therein and representing the reference sequences, and ii) means to modulate the signal beam simultaneously with a plurality of the reference patterns to form the multi-channel correlation beam.

25. A system for searching a data base for a given sequence, the data base having a multitude of reference sequences, the system comprising:

means to generate a coherent light beam;

means to modulate the light beam with a pattern representing the given sequence to form a modulated signal beam;

means to further modulate the modulated signal beam with reference patterns representing the reference sequences to form a multi-channel correlation beam;

means to measure an intensity of each channel of the correlation beam; and means to generate a signal when the intensity of one of the channels of the correlation beam is above a preset level to indicate that the given sequence correlates with one of the reference sequences; wherein:

the means to modulate the light beam includes i) a first optical medium having a multitude of optical diffraction patterns formed therein, each of the optical diffraction patterns representing the given sequence, and ii) means to modulate the light beam with each of the optical diffraction patterns to form the signal beam with a multitude of channels; and the means to further modulate the modulated signal beam includes i) a second optical medium having a multitude of reference optical diffraction patterns formed therein, each of said reference patterns representing a respective one of the reference sequences, and ii) means to use each of the reference diffraction patterns to modulate a respective one of the channels of the signal beam.

26. A system for searching a data base for a given sequence, the data base having a multitude of reference sequences, the system comprising:

means to generate a coherent light beam;

means to modulate the light beam with a pattern representing the given sequence to form a modulated signal beam;

means to further modulate the modulated signal beam with reference patterns representing the reference sequences to form a multi-channel correlation beam;

means to measure an intensity of each channel of the correlation beam; and means to generate a signal when the intensity of one of the channels of the correlation beam is above a preset level to indicate that the given sequence correlates with one of the reference sequences;

wherein the given sequence includes a plurality of types of elements, and a respective one sine wave pattern is associated with each one of the types of elements, and wherein:

the means to modulate the light beam includes a first optical medium having an optical diffraction pattern formed therein, said optical diffraction pattern being formed from a sequence of the sine wave patterns associated with the elements of the given sequence.

27. A system for searching a data base for a given sequence, the data base having a multitude of reference sequences, the system comprising:

means to generate a coherent light beam;

means to modulate the light beam with a pattern representing the given sequence to form a modulated signal beam;

means to further modulate the modulated signal beam with reference patterns representing the reference sequences to form a multi-channel correlation beam;

means to measure an intensity of each channel of the correlation beam; and means to generate a signal when the intensity of one of the channels of the correlation beam is above a preset level to indicate that the given sequence correlates with one of the reference sequences;

wherein each of the reference sequences includes a plurality of types of elements, and a respective one sine wave pattern is associated with each one of the types of elements, and wherein:

the means to further modulate the modulated signal beam includes an optical medium having a multitude of optical diffraction patterns formed therein, each of the optical patterns representing a respective one of the reference sequences and being formed from a sequence of the sine wave patterns associated with one of the reference sequences.

28. A system for searching a data base for a given sequence, the data base having a multitude of reference sequences, the given sequence and each of the reference sequences including a plurality of types of elements, the system comprising:

means to generate a first light beam having a first frequency;

means to generate a second light beam having a second frequency;

a memory bank holding a respective one data value for each element of the given sequence and for each element of each reference sequence;

means to modulate the first light beam with acoustical signals representing the data values assigned to the elements of the reference sequences;

means to modulate the second light beam with acoustical signals representing the data values assigned to the elements of the given sequence; and means to generate correlation signal representing the correlation of the modulated first and second light beams.

29. A system according to claim 28, wherein each of the first and second modulated light beams has a respective amplitude, and wherein:

the means to generate the correlation signal includes means to generate a signal having an amplitude proportional to the product of the amplitudes of the first and second modulated light beams.

30. A system according to claim 29, wherein the given sequence and the reference sequences are DNA sequences, and wherein:

the means to modulate the first light beam includes i) a first acousto-optic cell, ii) means to transmit the first light beam through the first acousto-optic cell, and iii) means to drive the first acousto-optic cell to modulate the first light beam in response to data values stored in the memory bank for the elements of the reference sequences; and the means to modulate the second light beam includes i) a second acousto-optic cell, ii) means to transmit the second light beam through the second acousto-optic cell, and iii) means to drive the second acousto-optic cell to modulate the second light beam in response to data values stored in the memory bank for the elements of the given sequence.

* * * * *